E. W. IVES.
Carriage-Axle Nuts.

No. 154,255. Patented Aug. 18, 1874.

Witnesses.

Eldridge W. Ives
Inventor
By Atty.

UNITED STATES PATENT OFFICE.

ELDRIDGE W. IVES, OF NORFOLK, CONNECTICUT.

IMPROVEMENT IN CARRIAGE-AXLE NUTS.

Specification forming part of Letters Patent No. 154,255, dated August 18, 1874; application filed July 29, 1874.

*To all whom it may concern:*

Be it known that I, ELDRIDGE W. IVES, of Norfolk, in the county of Litchfield and State of Connecticut, have invented a new and useful Improvement in Carriage-Axle Nuts; and I do hereby declare the following, when taken in connection with the accompanying drawings and the letters of reference marked thereon, to be a full, clear, and exact description of the same, and which said drawings constitute part of this specification, and represent, in—

Figure 1:
Figure 2:
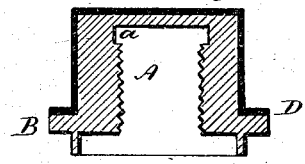
Figure 3:
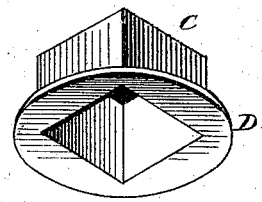
Figure 4:
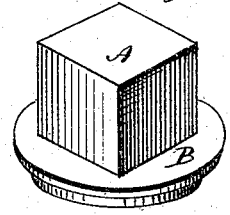

Figure 1, a side view, Fig. 2, a vertical section, Fig. 3, perspective view, of the shell, detached; and, in Fig. 4, perspective view of the nut as prepared to receive the shell.

This invention relates to an improvement in the nuts which are set upon the outer end of carriage-axles to secure the wheel upon the axle, and particularly to that class which are designed to represent the more precious metals. This class of nuts are usually formed from brass or similar fine metal, then finished and plated according to the requirements of the trade. In some cases, however, these nuts are made of cast-iron and the surface finished and plated; but the liability of the iron to oxidize and cause the plating to flake off makes this class of nuts objectionable, while the first are very expensive.

The object of this invention is to produce a nut with a fine metal surface at a reduced cost; and it consists in forming a sheet-metal shell to cover the exposed surface of the nut, and which is set onto the nut and secured thereto by brazing or otherwise, as more fully hereinafter described.

A is the nut, as seen in Fig. 4, which is of the usual form of carriage-axle nuts, having a flange, B, around its base. From brass or similar ductile metal I strike up a shell, C, corresponding to the body of the nut, and with a flange, D, corresponding to the flange B, at base of the nut, as seen in Fig. 3. This is made to fit closely onto the nut, as seen in Fig. 2, and is set onto the nut with the solder or similar material placed between the two, (the meeting surfaces of the nut and the shell being first prepared;) then heated, the solder will flow over the surface and cause the shell to attach to the nut and become practically a part of it.

The surface of the shell is polished and left the color of the metal, or may be plated, according to the demands of the trade.

These nuts are usually made with the outer end closed, as seen in Fig. 2, which necessitates the forming of a channel, a, at the inner extremity of the threaded portion, in order to perfectly form the thread.

By the employment of the shell the nut may be drilled and the thread cut entirely through, the shell covering the opening at the outer end, thus avoiding considerable labor in threading the nut.

I claim—

The herein-described carriage-nut, its surface inclosed by a sheet-metal shell, substantially as set forth.

ELDRIDGE W. IVES.

Witnesses:
   JOS. N. COWLES,
   E. D. IVES.